(12) United States Patent
Lombardi et al.

(10) Patent No.: US 9,544,416 B2
(45) Date of Patent: Jan. 10, 2017

(54) KEYBOARD FUNCTION IN A MODULAR PORTABLE ELECTRONIC DEVICE

(71) Applicant: Motorola Mobility LLC, Chicago, IL (US)

(72) Inventors: Michael J Lombardi, Lake Zurich, IL (US); Michael Thomas Corrigan, Palatine, IL (US); Paul Fordham, Wauconda, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 14/697,083

(22) Filed: Apr. 27, 2015

(65) Prior Publication Data
US 2016/0316050 A1    Oct. 27, 2016

(51) Int. Cl.
*H04M 1/725* (2006.01)
*H04M 1/02* (2006.01)

(52) U.S. Cl.
CPC ......... *H04M 1/7253* (2013.01); *H04M 1/0256* (2013.01); *H04M 2250/18* (2013.01); *H04M 2250/22* (2013.01)

(58) Field of Classification Search
CPC .............. H04M 1/7253; H04M 1/0256; H04M 2250/22; H04M 2250/18
See application file for complete search history.

(56) References Cited

U.S. PATENT DOCUMENTS

| | | | | |
|---|---|---|---|---|
| 6,115,616 A | * | 9/2000 | Halperin | H04M 1/0254 341/22 |
| 6,208,867 B1 | * | 3/2001 | Kobayashi | H04B 10/1143 379/56.3 |
| 7,031,692 B1 | * | 4/2006 | Zanzi | H04M 1/0254 455/346 |
| 8,519,962 B2 | * | 8/2013 | Han | G06F 1/1626 345/169 |
| 8,521,229 B2 | * | 8/2013 | Naruse | H04M 1/0256 370/311 |
| 8,805,439 B2 | * | 8/2014 | Kim | H04M 1/72575 455/550.1 |

(Continued)

OTHER PUBLICATIONS

Michael J. Lombardi, et al., "Portable Electronic Device Contact Puck Alignment", U.S. Appl. No. 14/629,919, filed Feb. 24, 2015.

(Continued)

*Primary Examiner* — Nathan Mitchell

(57) ABSTRACT

A modular portable device system and method allow extended user input. The system includes a first device and a second device, the devices being attachable via a plurality of magnetic attachment points (magnets or magnetically responsive attachment points) on each. In a first configuration, the devices are held together by all of the magnetic attachment points, and in this configuration an extended user input facility on the second device is not user-accessible. In a second configuration, the devices are connected by only a subset of the magnetic attachment points, and in this second configuration the extended user input facility is user-accessible. A Hall Effect sensor on the first device and sensor magnet on the second device are positioned to overlap when the devices are connected in the second configuration in order to alert the first device that the second device has been attached in the extended input mode.

18 Claims, 8 Drawing Sheets

(56) References Cited

U.S. PATENT DOCUMENTS

| | | | | |
|---|---|---|---|---|
| 2002/0042291 A1* | 4/2002 | Lahteenmaki | H04M 1/0202 | 455/566 |
| 2002/0082042 A1* | 6/2002 | Mark | H04M 1/0254 | 455/550.1 |
| 2003/0148752 A1* | 8/2003 | Chen | H04B 1/1615 | 455/574 |
| 2004/0012558 A1* | 1/2004 | Kisuki | G06F 1/1632 | 345/156 |
| 2005/0090294 A1* | 4/2005 | Narasimhan | H04L 29/06 | 455/575.1 |
| 2008/0070500 A1* | 3/2008 | Rapp | H04N 5/2251 | 455/41.1 |
| 2008/0182634 A1* | 7/2008 | Cho | H04M 1/0237 | 455/575.4 |
| 2008/0293367 A1* | 11/2008 | Wulff | H04M 1/0256 | 455/90.3 |
| 2010/0130270 A1* | 5/2010 | Naruse | H04M 1/0256 | 455/575.1 |
| 2010/0304793 A1* | 12/2010 | Kim | G06F 1/1692 | 455/566 |
| 2010/0304800 A1* | 12/2010 | Giustina | H04M 1/0245 | 455/575.4 |
| 2010/0311479 A1* | 12/2010 | Sip | G06F 1/1624 | 455/575.4 |
| 2012/0200990 A1* | 8/2012 | Fyke | H04M 1/0237 | 361/679.01 |
| 2013/0170126 A1* | 7/2013 | Lee | G06F 1/1654 | 361/679.17 |
| 2016/0026221 A1* | 1/2016 | Lee | G06F 1/1654 | 361/679.29 |
| 2016/0149597 A1* | 5/2016 | Takasu | H04B 1/04 | 455/127.2 |

OTHER PUBLICATIONS

Michael J. Lombardi, et al., "Modular Portable Cellular Device Layout and Connection System", U.S. Appl. No. 14/615,519, filed Feb. 6, 2015.

* cited by examiner

KEYBOARD FUNCTION IN A MODULAR PORTABLE ELECTRONIC DEVICE

TECHNICAL FIELD

The present disclosure is related generally to mobile communication device input functions, and, more particularly, to a system and method for keyboard operation in a modular portable communication device.

BACKGROUND

While modern portable electronic devices are highly capable, the average user does not use all, or even most, of the capabilities of their device. Moreover, users continue to ask for lighter devices. Taking these observations together, a modular device approach may be seen as one solution to provide a customized device experience. In a modular approach, each user's device is customized via add on modules, to support the extended functions that the user does desire without unnecessarily complicating the base device.

In this model, a light and thin base cellular device is provided having certain basic functions such as phone, text, WiFi, email and basic sound and photo capabilities. Add-on modules can be docked to the base device to add more powerful features or sets of features. For example, a more professional camera module can be used to extend the basic photo abilities of the base module. Similarly, an audio module may be added to enable better sound quality as compared to the basic speaker system built into the base device.

However, even with a customized modular phone, it is still beneficial to use space and weight efficiently. Thus, a user desiring better user input options such as an enlarged keyboard would still not typically add an extension module that only provides improved input functionality. As such, even in a modular system, a user would typically still be limited to existing input options provided by the base device.

While the present disclosure is directed to a system that can eliminate certain shortcomings noted in this Background section, it should be appreciated that such a benefit is neither a limitation on the scope of the disclosed principles nor of the attached claims, except to the extent expressly noted in the claims. Additionally, the discussion of technology in this Background section is reflective of the inventors' own observations, considerations, and thoughts, and is in no way intended to accurately catalog or comprehensively summarize the art in the public domain. As such, the inventors expressly disclaim this section as admitted or assumed prior art with respect to the discussed details. Moreover, the identification herein of a desirable course of action reflects the inventors' own observations and ideas, and should not be assumed to indicate an art-recognized desirability.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
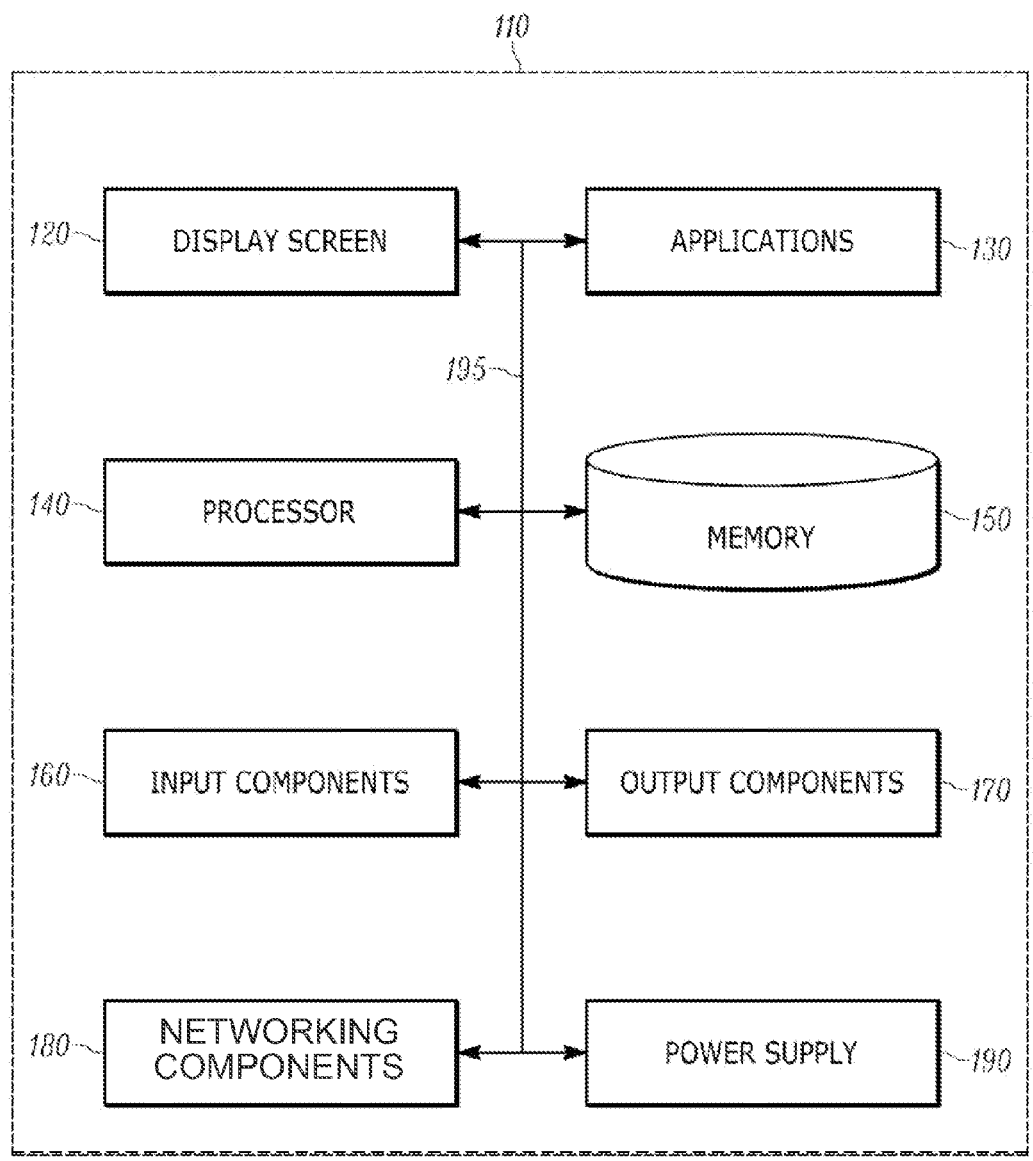
FIG. 1 is a simplified schematic of an example configuration of device components with respect to which embodiments of the presently disclosed principles may be implemented.

Before presenting a fuller discussion of the disclosed principles, an overview is given to aid the reader in understanding the later discussion. As noted above, even in a modular design, user input facilities for portable devices tend to be small and inefficient. However, the inventors have derived a solution specifically applicable to modular systems, wherein previously hidden portions of a module serve as an enlarged surface for user input.

In particular, in an embodiment of the disclosed principles, four magnets located on a back surface of either the primary module or the secondary module are situated and configured to connect to four steel discs on the back of the other of the primary module and the secondary module. When connected in this first configuration, the two modules are electrically connected to one another such that data and power are shared freely between the devices as needed. The magnetic force between the magnets and steel discs is sufficient not only to hold the weight of each device, but also to overcome any electrical contact spring force that would otherwise force the devices apart. The magnet to steel disc connection may include physical contact or may simply be attraction between a magnet and corresponding steel disc without physical contact between those two components.

With respect to extending user input, in a second configuration, the two devices are rearranged such that they are offset from each other across the width of the device. In this configuration, an input surface on the second device that was hidden in the first configuration is exposed. The two devices are held together in the second configuration by just two of the four magnets with the input device exposed.

A Hall effect sensor on one of the devices and a magnet on the other device come into alignment in the second configuration, such that the Hall effect sensor provides an indication, e.g., to the first device, that the second device should be treated as the user input source. In an embodiment, the first device then interacts with the input device wirelessly. In an alternative embodiment, the retention magnets and plates provide a data exchange channel when in the devices are in the secondary configuration.

Although the force of two retention magnets is less than the force of all four, the two magnets provide adequate retention in the second configuration because the magnets no longer need to overcome the contact force exerted in the first configuration. The dual orientation magnetic retention system disclosed herein provides substantial advantages over traditional keyboard input systems such as sliding keyboards, which impose substantial thickness, cost, and weight penalties.

With this overview in mind, and turning now to a more detailed discussion in conjunction with the attached figures, the techniques of the present disclosure are illustrated as being implemented in a suitable computing environment. The following device description is based on embodiments and examples of the disclosed principles and should not be taken as limiting the claims with regard to alternative embodiments that are not explicitly described herein. Thus, for example, while FIG. 1 illustrates an example mobile device within which embodiments of the disclosed principles may be implemented, it will be appreciated that other device types may be used.

The schematic diagram of FIG. 1 shows an exemplary component group 110 forming part of an environment within which aspects of the present disclosure may be implemented. In particular, the component group 110 includes exemplary components that may be employed in a device corresponding to the first device and/or the second device. It will be appreciated that additional or alternative components may be used in a given implementation depending upon user preference, component availability, price point, and other considerations.

In the illustrated embodiment, the components 110 include a display screen 120, applications (e.g., programs) 130, a processor 140, a memory 150, one or more input components 160 such as speech and text input facilities, and one or more output components 170 such as text and audible output facilities, e.g., one or more speakers. In an embodiment, the input components 160 include a keyboard on a surface of the device.

The processor 140 may be any of a microprocessor, microcomputer, application-specific integrated circuit, or the like. For example, the processor 140 can be implemented by one or more microprocessors or controllers from any desired family or manufacturer. Similarly, the memory 150 may reside on the same integrated circuit as the processor 140. Additionally or alternatively, the memory 150 may be accessed via a network, e.g., via cloud-based storage. The memory 150 may include a random access memory (i.e., Synchronous Dynamic Random Access Memory (SDRAM), Dynamic Random Access Memory (DRAM), RAMBUS Dynamic Random Access Memory (RDRM) or any other type of random access memory device). Additionally or alternatively, the memory 150 may include a read only memory (i.e., a hard drive, flash memory or any other desired type of memory device).

The information that is stored by the memory 150 can include program code associated with one or more operating systems or applications as well as informational data, e.g., program parameters, process data, etc. The operating system and applications are typically implemented via executable instructions stored in a non-transitory computer readable medium (e.g., memory 150) to control basic functions of the electronic device. Such functions may include, for example, interaction among various internal components and storage and retrieval of applications and data to and from the memory 150.

Further with respect to the applications 130, these typically utilize the operating system to provide more specific functionality, such as file system service and handling of protected and unprotected data stored in the memory 150. Although many applications may provide standard or required functionality of the user device 110, in other cases applications provide optional or specialized functionality, and may be supplied by third party vendors or the device manufacturer.

Finally, with respect to informational data, e.g., program parameters and process data, this non-executable information can be referenced, manipulated, or written by the operating system or an application. Such informational data can include, for example, data that are preprogrammed into the device during manufacture, data that are created by the device or added by the user, or any of a variety of types of information that are uploaded to, downloaded from, or otherwise accessed at servers or other devices with which the device is in communication during its ongoing operation.

The device having component group 110 may include software and hardware networking components 180 to allow communications to and from the device. Such networking components 180 will typically provide wireless networking functionality, although wired networking may additionally or alternatively be supported.

In an embodiment, a power supply 190, such as a battery or fuel cell, may be included for providing power to the device and its components 110. All or some of the internal components 110 communicate with one another by way of one or more shared or dedicated internal communication links 195, such as an internal bus.

In an embodiment, the device 110 is programmed such that the processor 140 and memory 150 interact with the other components of the device 110 to perform certain functions. The processor 140 may include or implement various modules and execute programs for initiating different activities such as launching an application, transferring data, and toggling through various graphical user interface objects (e.g., toggling through various display icons that are linked to executable applications).

Figure 2:
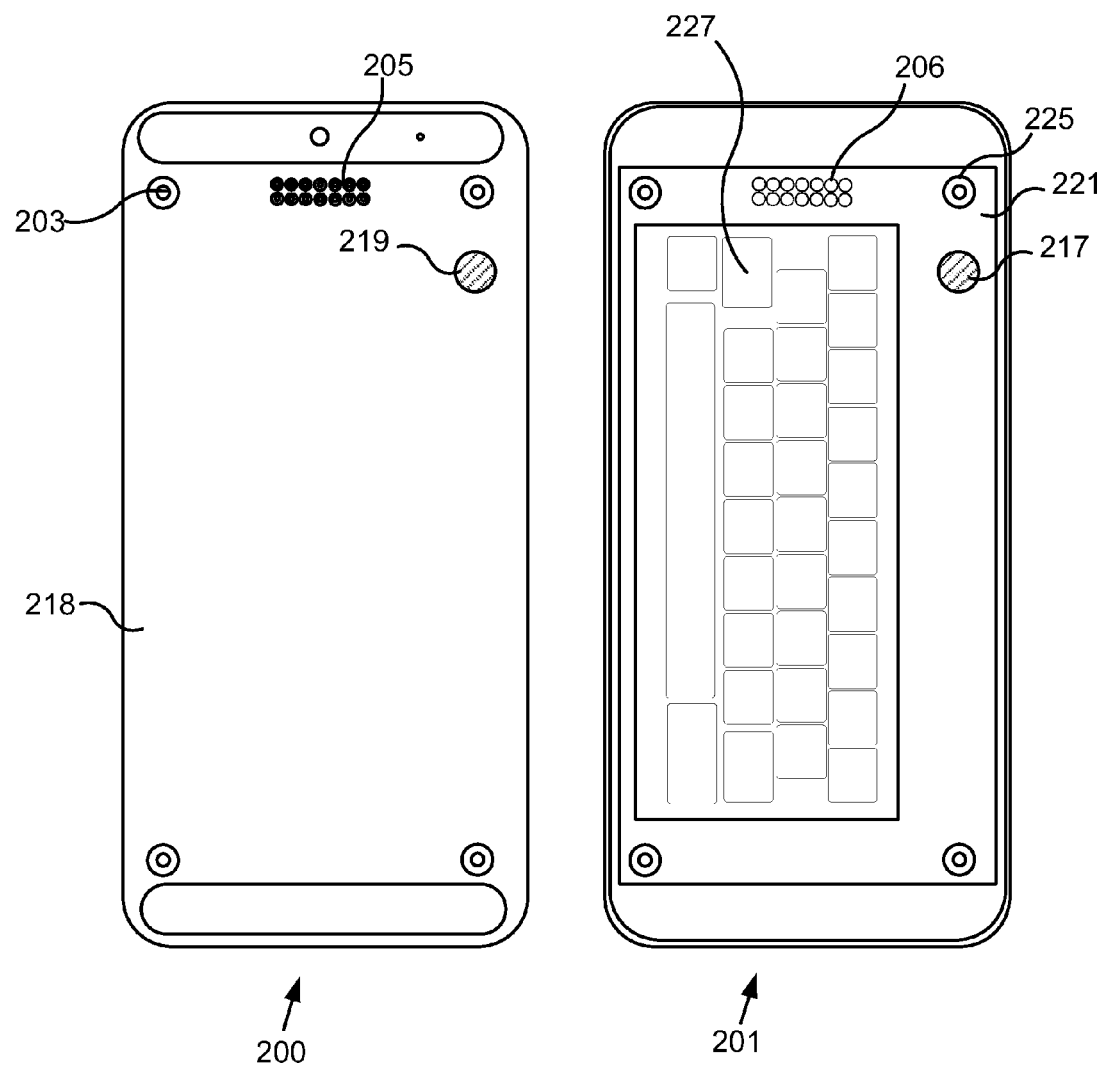
FIG. 2 is view of a first device and a second device, showing the back of the first device and the back of the second device in accordance with an embodiment of the disclosed principles.

Turning to FIG. 2, this figure presents a view of the first device 200 and the second device 201, showing the back of the first device 200 and the back of the second device 201 in accordance with an embodiment of the disclosed principles. In the illustrated example, the back 218 of the first device 200 includes one or more ferrous steel alignment features 203, configured and placed to mate with mating features 225 on the back 221 of the second device 201. The mating features 225 in an embodiment are magnets. It will be appreciated that although the term ferrous is used often herein, ferromagnetic materials more generally may also be used.

In addition, the back of the first device 200 in the illustrated embodiment includes a connector array 205. The connector array 205 is located and configured to mate with a mating connector array 206 on the back 221 of the second device 201. One or both of the connector array 205 and the mating connector array 206 are spring loaded for positive contact.

In addition to the foregoing features, the back side 221 of the second device 201 includes a separate magnet 217, and the back side 218 of the first device 200 includes a Hall Effect sensor 219 or other magnetic field sensor. The functionality of the magnet 217 and Hall Effect sensor 219 in various embodiments will be discussed further below. Moreover, in the illustrated example, the second device 201 includes a large keyboard or touch screen input element 227. In an embodiment, the input element 227 is one of a hardware QWERTY keyboard, a touch screen and a touchpad with no display. The hardware QWERTY keyboard includes physical buttons that can be individually pressed, e.g., representing the letters of the alphabet, punctuation marks and other elements, digits or characters useful for entering textual data.

Figure 3:
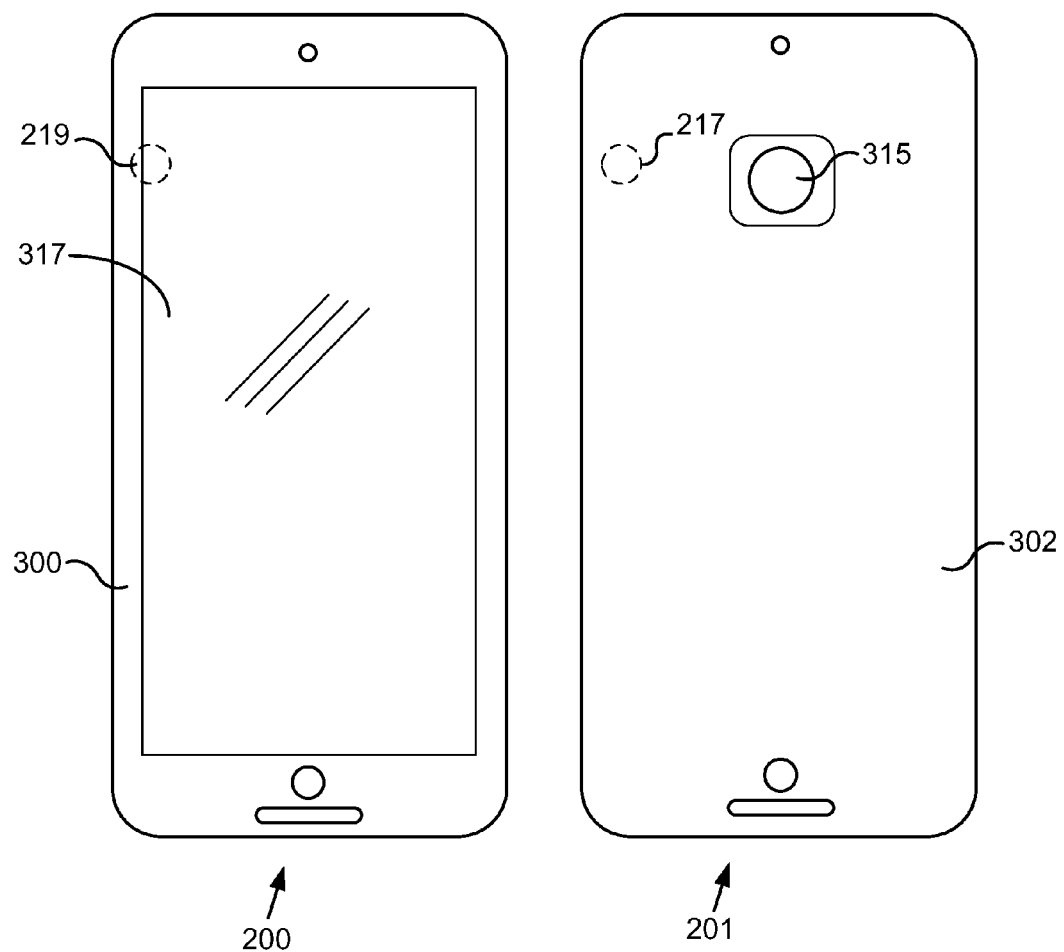
FIG. 3 is view of a first device and a second device, showing the front of the first device and the front of the second device in accordance with an embodiment of the disclosed principles.

FIG. 3 shows the front side of both devices 200, 201 in accordance with an embodiment of the disclosed principles. In the illustrated example, the front side 300 of the first device 200 includes a display screen 317, which may be a touch screen display for example. The Hall Effect sensor 219 on the opposite side of the device is shown in dashed outline.

The front side 302 of the second device 201 includes a camera 315 in the illustrated example. Although the second device 201 offers extended camera functionality in the given example, it will be appreciated that the second module may provide any desired type of additional functionality. As with the first device, the magnet 217 on the opposite side of the device 201 is shown in dashed outline.

Figure 4:
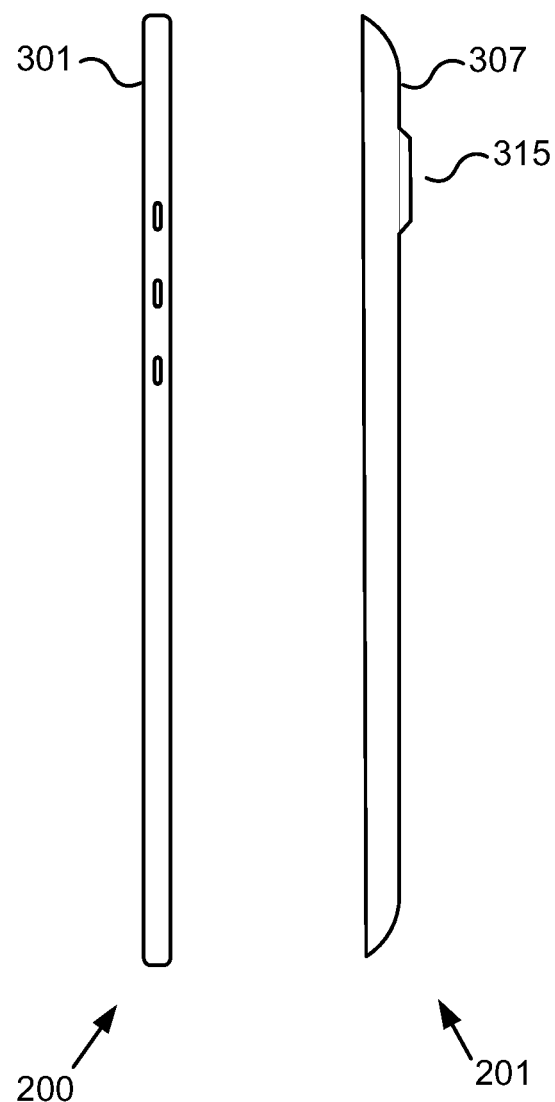
FIG. 4 is side view of the first device and the second device in accordance with an embodiment of the disclosed principles.
Figure 5:
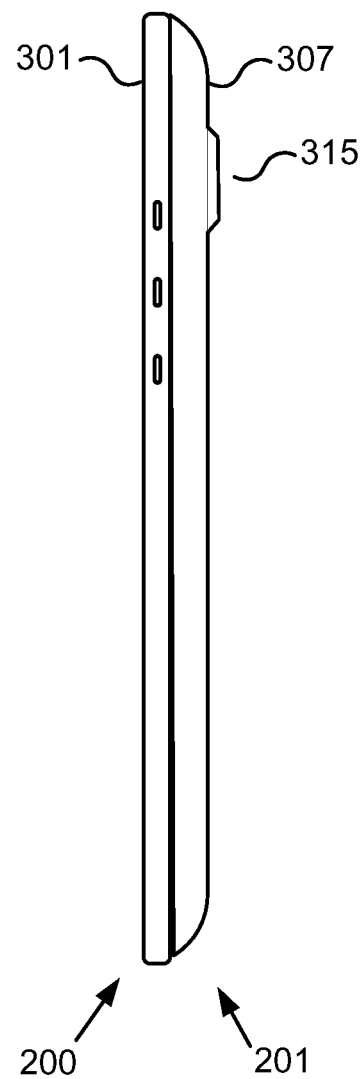
FIG. 5 is side view of the first device and the second device mated together in accordance with an embodiment of the disclosed principles.

For further physical context regarding the device orientation and connection scenarios, FIG. 4 is a side view of the first device 200 and the second device 201, not yet mated (docked) together. Continuing, FIG. 5 is a side view of the first device 200 and the second device 201 mated together at the backs 218, 221 of the first device 200 and second device 201 in accordance with an embodiment of the disclosed principles. As can be seen, the devices 200, 201 are in physical contact when mated. In should be noted that different embodiments of either device 200, 201 may vary significantly in thickness and shape from one another.

Figure 6:
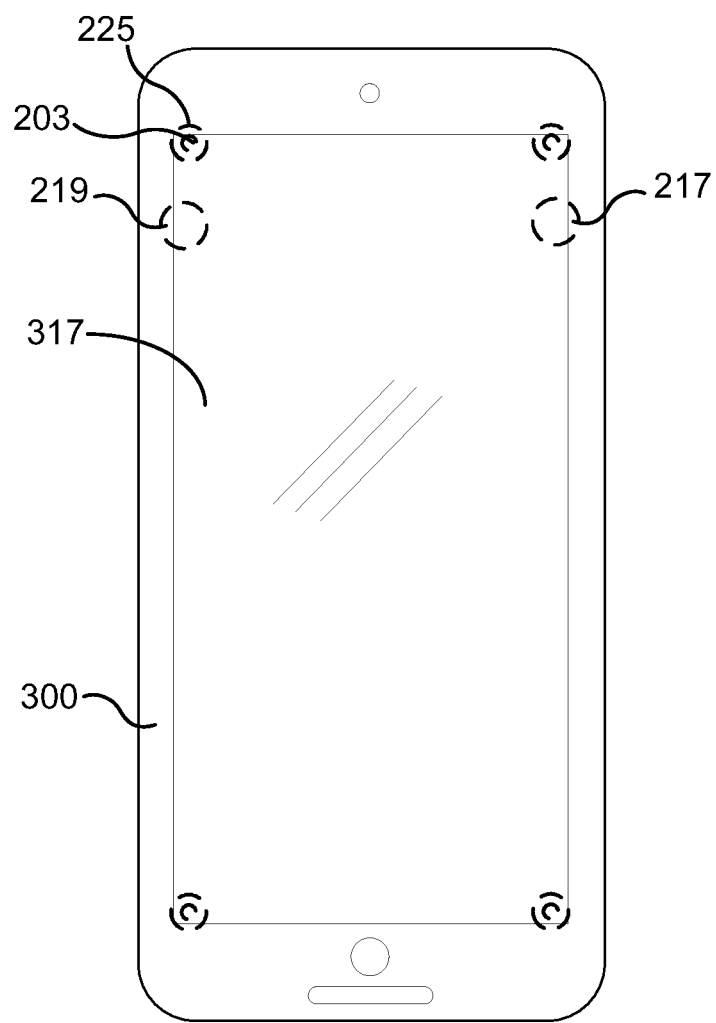
FIG. 6 is a front view of a combined device in a first configuration in accordance with an embodiment of the disclosed principles.

To further clarify the relationship of the magnets 225 and plates 203 of the device alignment system while the devices 200, 201 are connected, FIG. 6 shows the devices 200, 201 connected in the first configuration, viewed from the front side 300 of the first device 200. The keyboard 227 on the back 221 of the second device 201 is not visible or user-accessible in this configuration.

As can be seen, the four sets of magnets 225 and plates 203 of the device alignment system overlap and connect in this configuration. The rear of the combined device in this configuration is the front of the second device 201, which has no textual input facilities. As such, all user textual input in the illustrated first configuration is executed via a portion of the display screen 317.

Figure 7:
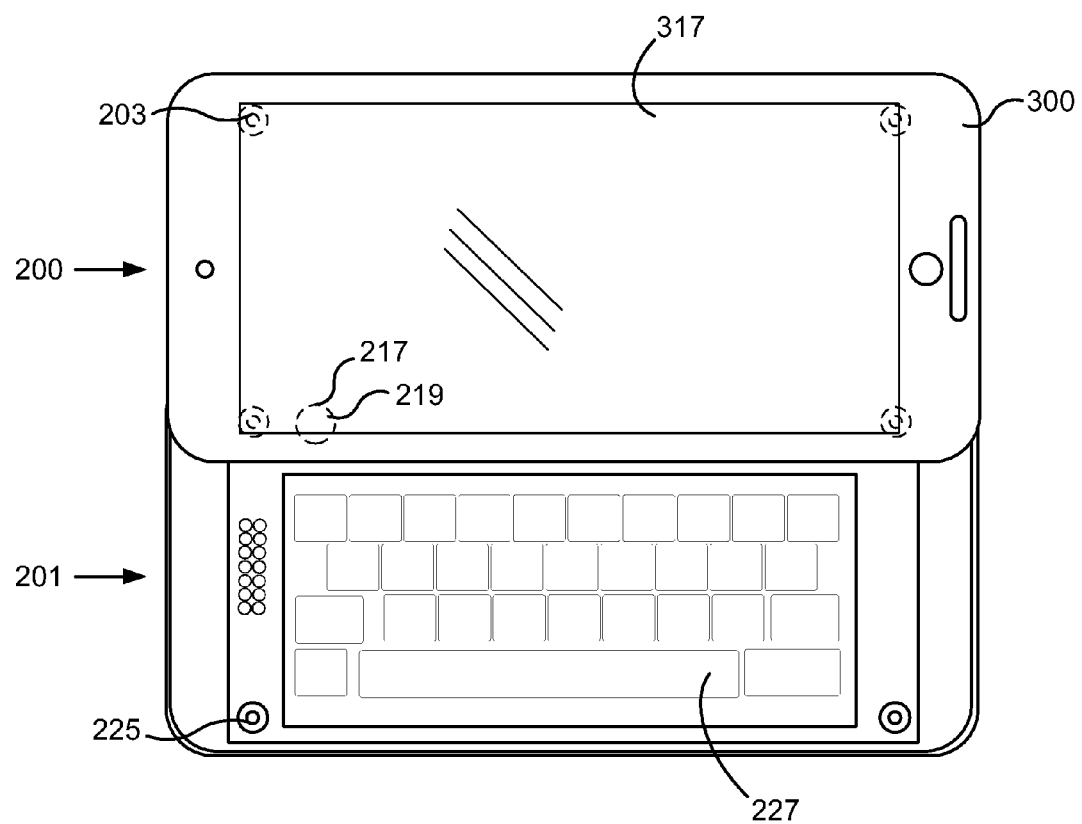
FIG. 7 is a front view of a combined device in a second configuration in accordance with an embodiment of the disclosed principles.

However, in the second configuration, the back side 221 of the second device 201 provides ample user input space while the devices nonetheless remain connected. This configuration is shown in FIG. 7. As can be seen, the devices 200, 201 are retained in a docked position by only two pairs of the magnets 225 and plates 203 of the device alignment system. The contact arrays are not mated in this configuration, and as such, there is no need to overcome a spring contact force.

In the view of FIG. 7, both the display screen 317 of the first device 200 and the keyboard 227 of the second device 201 are visible and user-accessible. In addition, the devices 200, 201 are communicatively linked via short range wireless linking, e.g., via Bluetooth. Alternatively, the devices 200, 201 may be communicatively linked via direct electrical connection. With respect to the latter embodiment, the two contacting sets of magnets 225 and plates 203 of the device alignment system also serve as electrical contacts for data exchange and optionally also for power transfer. In this embodiment, the magnets 225 may include an insulated conductive core that makes contact with the plates 203.

Importantly, in the second configuration as illustrated in FIG. 7, the magnet 217 and Hall Effect sensor 219 of the second 201 and first 200 devices respectively are in an overlapping relationship. In this relationship, the Hall effect sensor 219 produces, for the first device 200, a signal indicative of the presence of the second device 201 and the fact that the devices 200, 201 are connected in the second configuration. Responsive to this indication, the first device 200 opens communications with the second device 201 via a channel other than the mating connector arrays 205, 206, e.g., via a wireless channel or otherwise as indicated above.

Figure 8:
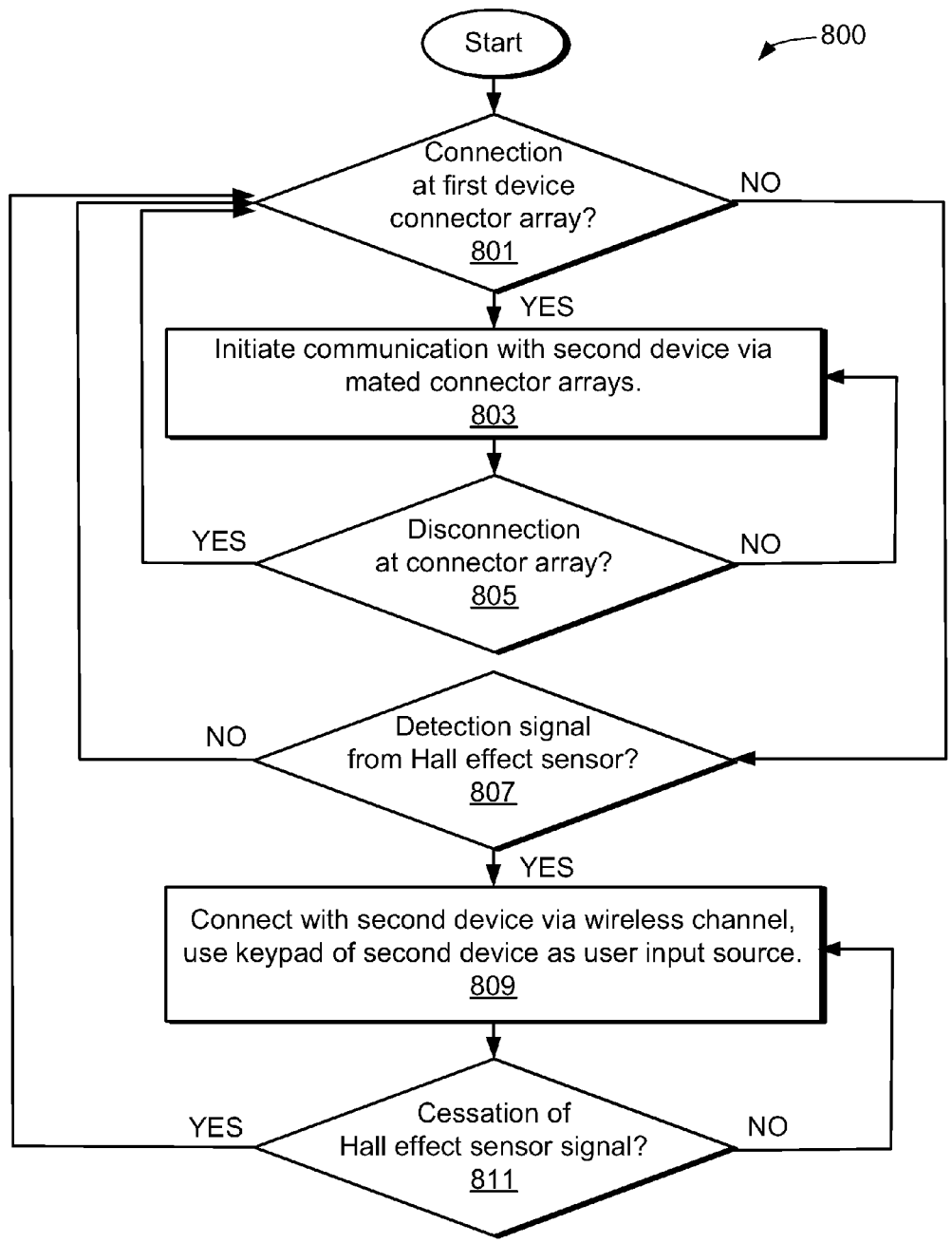
FIG. 8 is a flowchart illustrating a process in accordance with an embodiment of the disclosed principles.

FIG. 8 illustrates an example process 800 executed by the processor of the first device 200 to configure communications between the devices 200, 201 in keeping with a current mating configuration. At stage 801 of the process 800, the processor 140 of the first device 200 checks for the presence of the second device 201 connector array 206 at its connector array 205. If such a connection is found, the process 800 flows to stage 803, wherein the processor 140 of the first device 200 initiates communication with the second device 201 via the mated connector arrays 205, 206 and continues operation in this mode until disconnection at the connector array 205 is detected at stage 805. In this mode, the display screen 317 of the first device 200 serves as the only user input facility. Once disconnection is detected, the process returns to stage 801.

If instead at stage 801 no connection is found, the process flows to stage 807, wherein the processor 140 checks for a magnetic field detection signal from the Hall Effect sensor 219. If such a signal is detected, the process flows to stage 809, wherein the processor 140 causes the first device 200 to connect with the second device 201 via a wireless channel, and to use the keypad 227 of the second device 201 as its user input source. As noted above, the attached magnet 225 and plate 203 pairs may additionally or alternatively serve as contacts.

At stage 811, the processor 140 periodically determines whether the magnetic field detection signal continues to indicate that the devices are connected in the second configuration. If the magnetic field detection signal continues, the process 800 loops back to stage 809 to continue operation using the keypad 227 of the second device 201 as its user input source. Returning to stage 807, if no magnetic field detection signal was detected at this stage, the process 800 returns to stage 801 to await a connection indication.

It will be appreciated that a system and method for improved user input in a modular portable device have been disclosed herein. However, in view of the many possible embodiments to which the principles of the present disclosure may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:
1. A modular portable device system comprising:
a first portable device and a second portable device;
a plurality of magnetic attachment points on one of the first and second portable devices and a matching plurality of magnetically responsive attachment points on the other of the first and second portable devices, such that the devices are held together by a mating of each of the magnetic attachment points with a corresponding one of the magnetically responsive attachment points when the devices are connected in a first configuration, and the devices are held together by a mating of a subset of the magnetic attachment points with a corresponding subset of the magnetically responsive attach- ment points when the devices are connected in a second configuration, the first and second configurations being mutually exclusive;

a connector array on the first portable device and a mating connector array on the second portable device, such that the connector array and mating connector array are connected only in the first configuration; and an input region on the second device which is exposed only when the devices are in the second configuration, wherein the mating subset of the magnetic attachment points and the corresponding subset of the magnetically responsive attachment points act as electrical conductors when the devices are connected in the second configuration.

2. The modular portable device system in accordance with claim 1, wherein the input region on the second portable device includes a QWERTY keyboard.

3. The modular portable device system in accordance with claim 2, wherein the QWERTY keyboard is a touch sensing surface.

4. The modular portable device system in accordance with claim 2, wherein the QWERTY keyboard is a hardware keyboard.

5. The modular portable device system in accordance with claim 1, wherein the input region on the second portable device includes a touch screen.

6. The modular portable device system in accordance with claim 1, wherein the input region on the second portable device includes a touchpad with no display.

7. The modular portable device system in accordance with claim 1, wherein each device includes short range wireless communications infrastructure and batteries and wherein the devices are configured to communicate via short range wireless communications when the devices are connected in the second configuration.

8. The modular portable device system in accordance with claim 1, wherein one of the first and second portable devices includes a separate sensor magnet and the other of the other of the first and second portable devices includes a Hall Effect sensor positioned to overlap the separate sensor magnet when the devices are connected in the second configuration.

9. A method for providing extended user input facilities in a modular device system having first and second portable devices that are magnetically connectable, the method comprising:

attaching the first portable device to the second portable device using a plurality of magnets and mating magnetically responsive plates to form a first configuration, such that an extended user input surface on a surface of the second portable device is hidden in the first configuration, and providing a first user input facility on an exposed surface of the first portable device; and detecting that the devices have been reconnected in a second configuration wherein only a subset of the plurality of magnets and mating magnetically responsive plates are mated, such that the extended user input surface of the second portable device is exposed, and allowing user input to the device system via the extended user input surface, further comprising using the subset of the magnetic attachment points and the corresponding subset of the magnetically responsive attachment points as electrical conductors when the devices are connected in the second configuration.

10. The method of claim 9, wherein the extended user input surface includes a QWERTY keyboard.

11. The method of claim 10, wherein the QWERTY keyboard is a touch sensing surface.

12. The method of claim 10, wherein the QWERTY keyboard is a hardware keyboard.

13. The method of claim 9, wherein the extended user input surface includes a touch screen.

14. The method of claim 9, wherein the extended user input surface includes a touchpad with no display.

15. The method of claim 9, further comprising communicating between the devices via short range wireless communications when the devices are connected in the second configuration.

16. The method of claim 9, wherein detecting that the devices have been reconnected in the second configuration further comprises detecting that a Hall Effect sensor on one of the first and second portable devices overlaps a separate sensor magnet on the other of the first and second portable devices.

17. A portable electronic device configured to provide extended user input functionality comprising:

a first user input facility on a first face of the portable electronic device;

a connector array on an opposite face of the portable electronic device positioned to connect with a matching array on an extension module;

a set of magnetically responsive attachment elements on the opposite face of the portable electronic device positioned to overlay and mate with a matching set of magnetically responsive attachment elements on the extension module;

a magnetic sensor on the opposite face of the portable electronic device positioned to overlap a magnet on the extension module when only a subset of the magnetically responsive attachment elements on the portable electronic device overlay and mate with a matching subset of magnetically responsive attachment elements on the extension module;

further comprising using the subset of the magnetic attachment points and the corresponding subset of the magnetically responsive attachment points as electrical conductors when the devices are connected in the second configuration; and a processor configured to enable a second input facility located on the extension module when it receives a signal from the magnetic sensor.

18. The portable electronic device in accordance with claim 17, wherein the second input facility is selected from the group consisting of a QWERTY keyboard, a touch screen, and a touch pad without display.

* * * * *